United States Patent [19]

Schritt et al.

[11] 4,373,619

[45] Feb. 15, 1983

[54] TRANSMISSION CONTROL SYSTEM

[75] Inventors: Renaldo F. Schritt, Bothell; Martin J. Kenney, Redmond, both of Wash.

[73] Assignee: Grad-Line, Inc., Woodinville, Wash.

[21] Appl. No.: 121,890

[22] Filed: Apr. 7, 1980

[51] Int. Cl.³ .................... B60K 41/06; B60K 41/28
[52] U.S. Cl. ............................ 192/0.09; 192/0.052; 192/3.28; 192/4 B; 74/866
[58] Field of Search ............ 192/0.052, 0.09, 0.092, 192/3.28, 4 B; 74/866

[56] References Cited

U.S. PATENT DOCUMENTS

| | | | |
|---|---|---|---|
| 3,259,218 | 7/1966 | Black et al. | 192/4 B X |
| 3,354,744 | 11/1967 | Kühnle et al. | 192/3.28 X |
| 3,524,523 | 8/1970 | Kumex et al. | 192/4 B |
| 3,709,069 | 1/1973 | Hagen | 74/866 X |
| 3,937,105 | 2/1976 | Arai et al. | 74/866 X |
| 3,943,799 | 3/1976 | Sakai et al. | 74/866 |
| 3,961,546 | 6/1976 | Gilmore et al. | 74/866 |
| 4,023,443 | 5/1977 | Usui et al. | 74/866 |
| 4,030,380 | 6/1977 | Mutter | 74/866 |
| 4,033,202 | 7/1977 | Ahlen et al. | 74/866 |
| 4,082,013 | 4/1978 | Dornfeld et al. | 74/866 |
| 4,094,211 | 6/1978 | Espenschied | 74/866 |
| 4,106,368 | 8/1978 | Ivey | 74/866 |
| 4,107,776 | 8/1978 | Beale | 74/866 X |
| 4,117,747 | 10/1978 | Windsor | 74/866 |
| 4,140,031 | 2/1979 | Sibeud et al. | 74/866 |
| 4,148,231 | 4/1979 | Redzinski | 74/866 |
| 4,208,929 | 6/1980 | Heino et al. | 74/866 X |
| 4,224,842 | 9/1980 | Rabus | 74/866 |
| 4,262,335 | 4/1981 | Ahlen et al. | 74/866 X |
| 4,262,781 | 4/1981 | Schneider | 192/4 B |

FOREIGN PATENT DOCUMENTS

967268  5/1975  Canada ............................ 74/866

Primary Examiner—Rodney H. Bonck
Attorney, Agent, or Firm—Dowrey & Cross

[57] ABSTRACT

A control system for a shiftable multi-speed hydraulically operated transmission system. The transmission includes internal clutches which are selectively operated by the control system to effect shifting in neutral, reverse or forward speed ranges. The transmission system includes a manually operable multi-position speed range selector switch, sensing devices for ascertaining transmission input and output speeds, and other condition responsive switches. The control system includes logic circuits therein for receiving input signal information from the switches and sensing devices and for providing output signals to effect automatic shifting of the transmission to a selected speed range. The electronic controller provides operational safeguards, responds appropriately to system failures, and displays of relevant system information.

8 Claims, 5 Drawing Figures

TRANSMISSION CONTROL SYSTEM

BACKGROUND OF THE INVENTION

1. Field of the Invention

This invention relates generally to control systems for multi-speed shiftable power transmissions such as are used in off-highway vehicles and other applications. In particular, this invention relates to an electronic transmission control system which controls the operation of an automatic transmission in relation to the operational conditions of such vehicles.

2. Description of the Prior Art

Prior art systems for controlling a multi-speed shiftable power transmission are complex and costly and require redundant circuitry to effect proper sequential operation of the solenoid valves normally used in such power transmission systems. Prior art electronic control systems for multi-speed shiftable power transmissions have been limited in the control functions they are able to effect and have also been susceptible to failure due to acceleration forces, shock vibration and environmental conditions to which they are exposed during actual use on earth moving machines, trucks, or other equipment.

Some prior art transmission control systems require a great deal of skill on the part of the operator, which increases the possibility of damage to the system due to incorrect operational procedures.

It is known in the art to use an electronic control system for shifting a power transmission which is suitable for use in an automobile; however, such control systems do not have the capability to control a transmission in response to the conditions encountered in heavy-duty use, such as in off-highway vehicles or earth moving equipment.

SUMMARY OF THE INVENTION

A transmission control system in accordance with the present invention offers several advantages over prior art transmission control systems. For example, the invention is especially well-adapted for use with transmissions having movable range selector valves to effect relatively fast shifting. The invention processes a greater variety of input signal information than do prior art systems and thereby increases the likelihood of correct system operation. A transmission shift control system, in accordance with the present invention, provides automatic control of most shifting functions under normal operating conditions with an operator of the system having only to select a gear range and to actuate a throttle. The invention monitors the engine speed, the transmission output shaft speed and other operational conditions and provides control signals to shift the transmission in accordance with predetermined conditions and to prevent the occurrence of shifts which could damage the transmission or which could result in hazardous operating conditions.

A transmission control system in accordance with the present invention includes safety features which reduce the possibilities of system malfunctions or component damage under adverse conditions; and the invention responds to a wide variety of possible system failures to effect either automatic protective action, such as system shutdown, or to provide adequate and timely warning to the operator so that appropriate action may be taken.

The present invention requires less skill on the part of the operator than do prior art transmission control systems by providing greater operating efficiency in that correct speed ranges are selected and maintained, reducing the possibility of damage to the transmission due to incorrect operational procedures. The invention increases the operating life of transmission components by insuring that such components always operate within the correct speed ranges and design limits.

DESCRIPTION OF THE PREFERRED EMBODIMENT

Figure 1:
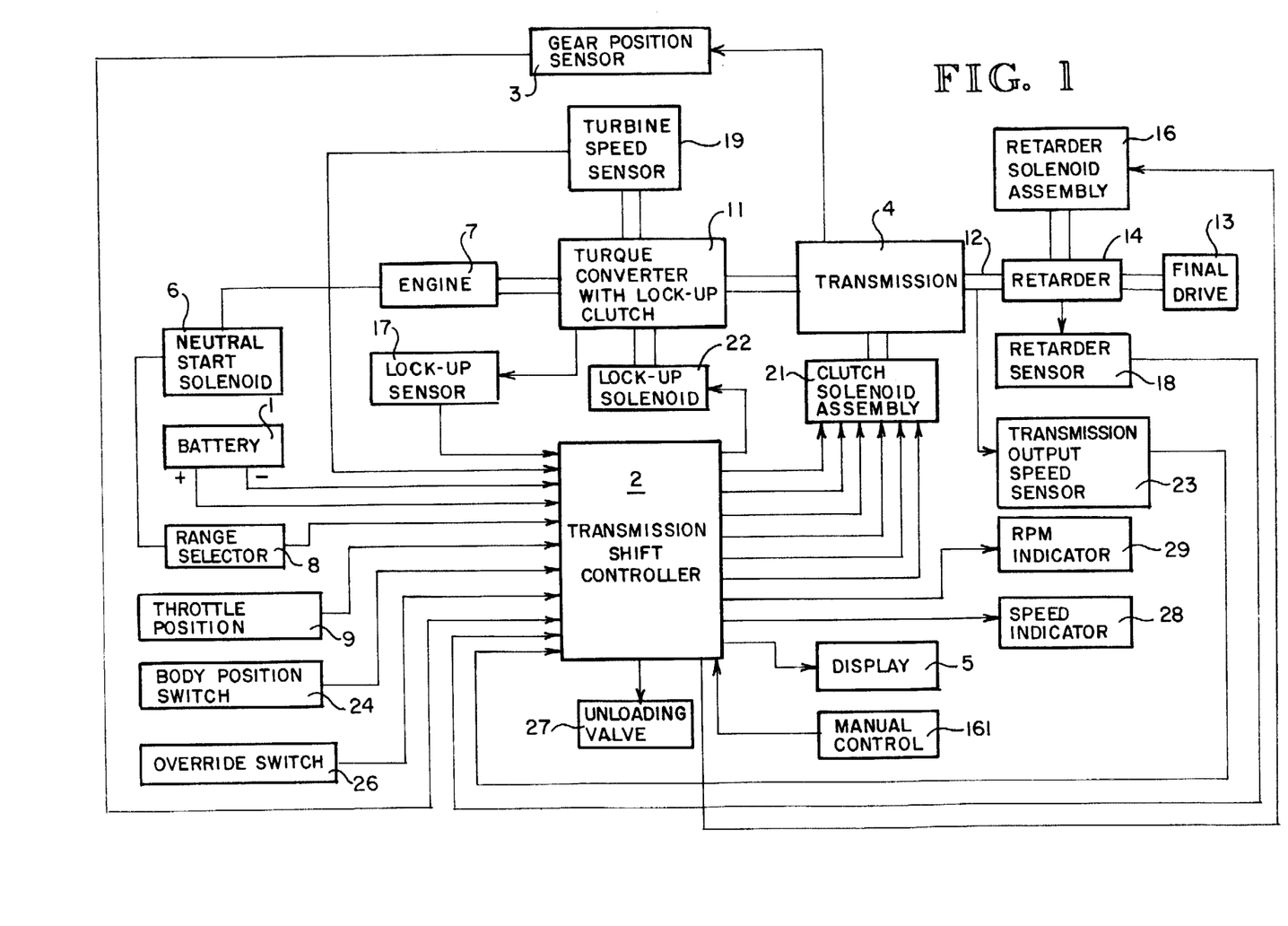
FIG. 1 is a block diagram of a transmission system illustrating functions controlled by a transmission control system according to the present invention.

FIG. 1 shows a power transmission system and an electronic control system therefor, which are suitable for use in an off-highway vehicle, such as a dump truck; however, the invention is not restricted to use in a vehicle or with a specific type of power transmission system. Application of electrical power from a battery 1 to a transmission shift controller 2 energizes the transmission shift controller 2, which monitors the output of a transmission gear position sensor 3 to determine the gear position of a transmission 4. The transmission 4 may be a hydraulically operated multi-clutch gear shift mechanism having a neutral range, a reverse range, a plurality of forward speed ranges. The transmission 4 includes a plurality of conventional hydraulically operated friction plate clutches (not shown) which cooperate with a plurality of gears (not shown) to provide, for example, nine forward speed ranges. The transmission controller 2 provides a signal to a display 5, which displays the transmission gear range to the operator of the vehicle.

In normal operations, a neutral start solenoid 6 allows the operator to start an engine 7 only when a range selector 8 is in the neutral range. Therefore, prior to starting the engine 7, the operator sets a range selector 8 to the neutral position and starts the engine 7. After starting the engine 7, the operator of the vehicle sets the range selector 8 to a desired range and actuates a throttle position switch 9.

The engine 7 drives the transmission 4 through a torque converter 11, which may have a lockup clutch incorporated therein for connecting the torque convertor for direct drive when the speed of the engine 7 is sufficiently high. The transmission 4 has an output shaft 12 which may be connected to a final drive gear assembly 13 through a retarder 14, controlled by a retarder solenoid assembly 16, which engages to effect retardation of the speed of the transmission output shaft 12 whenever the angular velocity thereof attains a predetermined value. A lockup sensor 17 provides signals to the transmission shift controller 2 to indicate engagement and disengagement of the lockup clutch in the torque convertor 11; and a retarder sensor 18 similarly provides signals to the transmission shift controller 2 to indicate engagement and disengagement of the retarder 14.

A turbine speed sensor 19, which may be a magnetic sensor, sends a signal proportional to the turbine speed of torque converter 11 and, hence the engine speed, to the transmission shift controller 2. If the range selector 8 is in first gear or higher and if the turbine of the torque converter 11 and the transmission output shaft speed are both less than predetermined values, the transmission shift controller 2 sends signals to a clutch solenoid assembly 21 to shift the transmission 4 into first gear. The transmission shift controller 2 inactivates the lockup clutch in torque converter 11 during shifting by sending a signal to a lockup solenoid 22 which disengages the lockup. Also during shifting, the transmission shift controller 2 sends a signal to the retarder solenoid assembly 16 which disengages the retarder 14. At a predetermined time, typically 1.5 seconds after shifting, the lockup solenoid 22 releases to lock the torque converter 11 for direct drive, provided that the output of the turbine speed sensor 19 indcates that the speed of the turbine of torque converter 11 is greater than a predetermined minimum value. If the engine 7 and the turbine of the torque converter 11 reach a predetermined maximum speed, the transmission shift controller 2 repeats the shifting process until the transmission 4 reaches the shift range selected on range selector 8.

The transmission shift controller 2 monitors the speed of the engine 7 by means of the turbine speed sensor 19 and if the output signal thereof indicates an engine speed of a less than a predetermined minimum downshift speed, the transmission shift controller 2 shifts the transmission 4 down at fixed time intervals until the transmission 4 is in first gear or until the engine speed stays above the downshift speed. In a typical application the transmission controller 2 downshifts the transmission 4 at an engine speed of 1300 rev/min and upshifts the transmission 4 at an engine speed of 1600 rev/min.

The range selector switch 8 includes a manually operable shift lever (not shown) which is moveable from a neutral position N to a reverse position R or to any of nine forward positions F1 through F9, shown in FIG. 2. The correct sequence of signals from the transmission shift controller 2 to the various solenoid valves and other check points in the electronic circuitry completes a single up or down shift. The highest gear achievable is limited by internal adjustment within the transmission shift controller 2 or by operator placement of the range selector 8 in the desired maximum position. For example, placement of range selector 8 in the sixth gear range allows the transmission 4 to operate from ranges F1–F6. The transmission shift controller 2 monitors the output of the transmission 4 at the output shaft 12, shown in FIG. 1, which is connected to a final drive gear assembly 13. A transmission output speed sensor 23 supplies a signal proportional to the output speed of the transmission 4 to the transmission shift controller 2, which inhibits shifting of the transmission 4 into reverse or neutral at indicated transmission output speeds above a predetermined value. The transmission shift controller 2 also monitors the turbine speed sensor 19 to control operator shifts from neutral to forward or reverse; and the transmission shift controller 2 inhibits shifts when the turbine speed sensor 19 indicates a turbine speed above a predetermined speed to prevent excessive drive line torques.

The retarder 14 remains disengaged until the engine 7 overspeeds in the new gear range, or until the operator manually actuates the retarder 14. The retarder 14 is actuated either manually or by the transmission shift controller 2. When speeds in excess of the normal engine high idle speed are achieved, the transmission shift controller 2 engages the retarder 14 to full capacity.

Placement of the range selector 8 in neutral when the vehicle is traveling forward at a speed above a predetermined speed results in non-attainment of neutral gear in the transmission 4 until the transmission output speed sensor 23 signals the achievement of a sufficiently low inhibit speed. When the operator shifts the range selector 8 to a lower gear, the transmission shift controller 2 shifts the transmission 4 to a lower gear only when the turbine speed sensor 19 indicates that the turbine of the torque converter 11 is at a predetermined downshift speed.

Referring again to FIG. 1, when a transmission control system according to the present invention controls the transmission of a dump truck, a body position switch 24 monitors the dump box position and sends an input to the transmission shift controller 2 which prevents the transmission 4 from shifting into reverse gear if the dump box (not shown) is up. In other applications, the body position switch 24 can inhibit any desired shift function dependent upon the occurrence of a predetermined event. A manually operable override switch 26 overrides the shift prevention function of the body position switch 24 to enable the transmission shift controller 2 to shift the transmission 4 beyond first gear when the dump box is up.

The control system may include an unloading valve 27 which reduces the pressure in the hydraulic system when the hydraulic system is doing no work. The control system may additionally include a speed indicator 28 and an RPM indicator 29.

Referring to FIG. 2, the transmission shift controller 2 includes a microcomputer 31 and circuitry to interface the microcomputer 31 with associated inputs and outputs. A connector 32, which may be a military standard connector, connects a positive input from the battery 1 to a power supply 33 which includes noise filtering circuitry, protection against reverse connection and high voltage transients and which stores sufficient energy to protect the system from loose connections. The output of the power supply 33 drives a Vcc power supply 34, which includes disconnect circuitry if the input from the power supply 33 drops below a specified voltage.

An input protection circuit 36 receives outputs from the throttle position switch 9, the body position switch 24, the dump override switch 26, and a light test circuit 37 through the connector 32 and interfaces these outputs to the microcomputer 31. The input protection circuit 36 protects the logic circuitry of the microcomputer 31 from spurious voltages.

The neutral contact N of the range selector 8 sends a signal through a connector 38 and an input protection circuit 39 to an input of a neutral start OR gate 41 while a manual enable switch M, which may be included in the range selector 8, sends a signal through the connector 38 and input protection circuitry 39 to the other input of the neutral start OR gate 41 through a resistance 131. The manual enable switch is connected to the expander U2 through a buffer 132. If either of the inputs to the neutral start OR gate 41 are true, then the neutral start OR gate 41 will output a signal through a buffer amplifier A2 and the connector 32 to the neutral start solenoid 6, connected to the vehicle wiring assembly 42 to start the engine 7.

The R contact of the transmission gear position sensor 3 supplies an actuating signal to a reverse alarm 43 through a connector 44, an input protection circuit 46, a buffer amplifier A3, and the connector 32. The reverse alarm 43 emits an audible warning when the transmission 4 is in reverse gear.

Figure 2A:
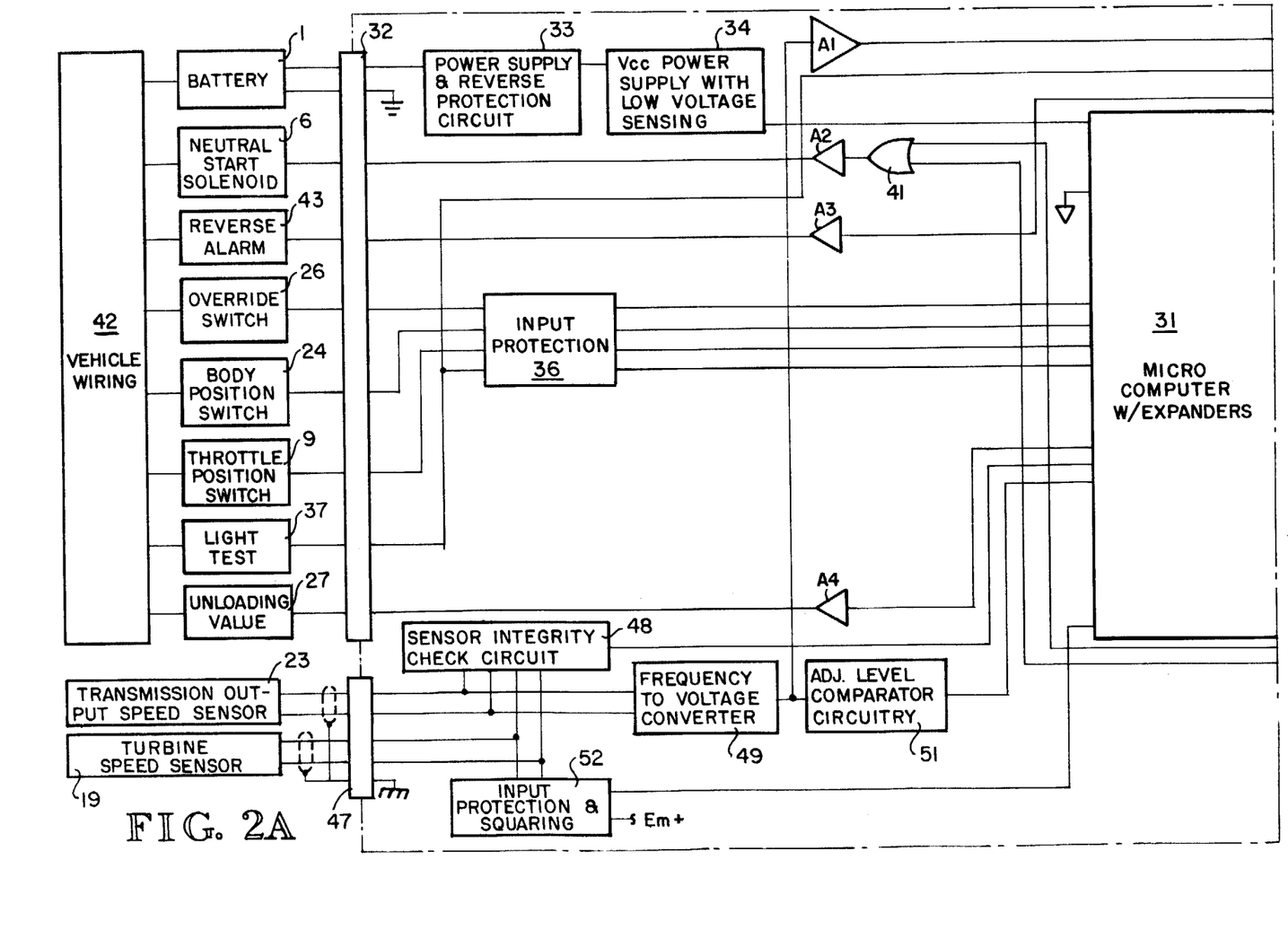
FIGS. 2(a) and 2(b) taken together are a functional block diagram of a transmission shift control system according to the present invention.
Figure 2B:
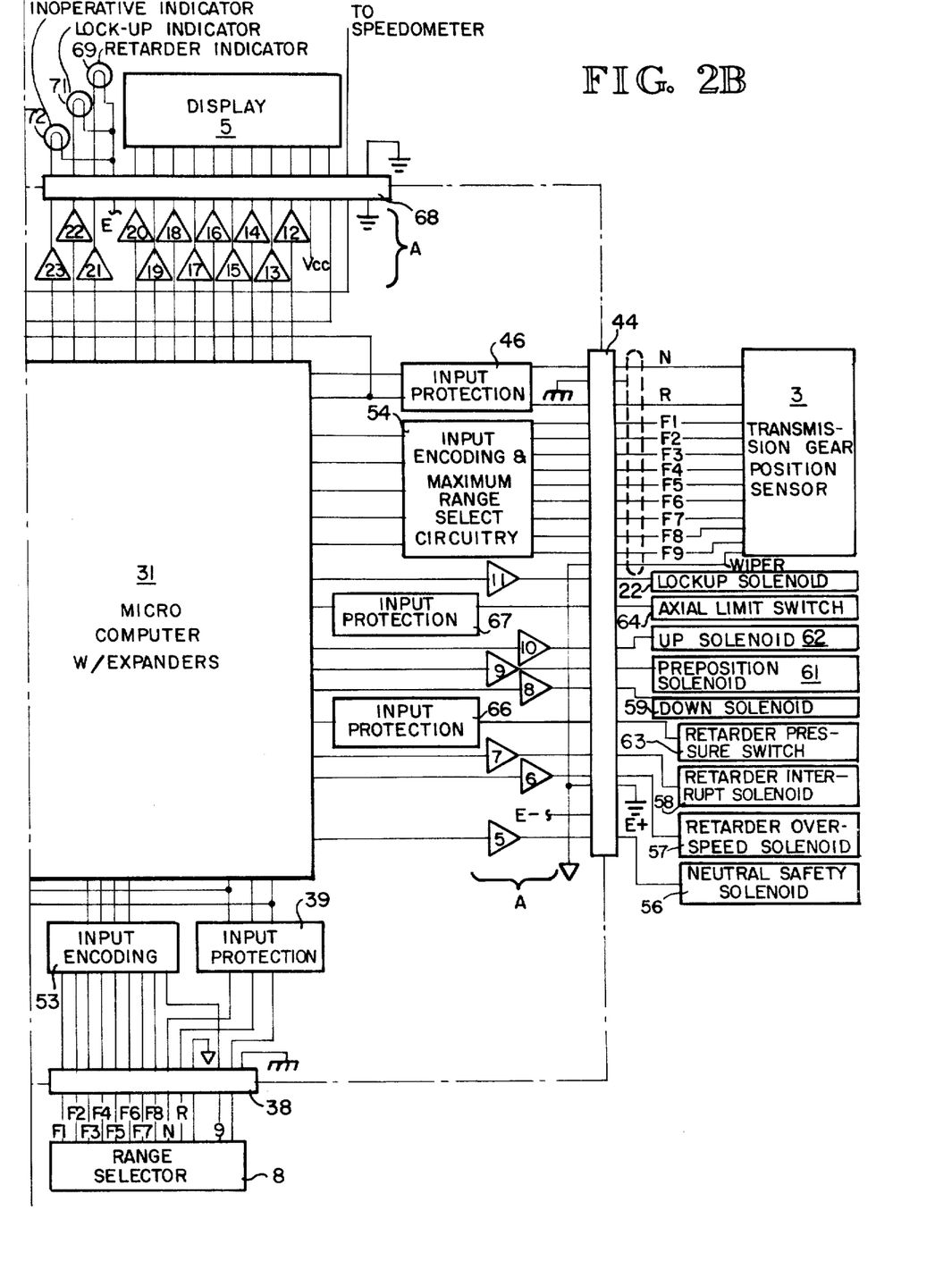

Referring to FIGS. 1, 2(a) and 2(b), the microcomputer 31 supplies an output to a buffer amplifier A4, which supplies a signal to the unloading valve 27 through the connector 32 when the transmission 4 is in neutral and the hydraulic system is doing no work to reduce the pressure in the system.

A connector 47 interfaces the outputs of the transmission output speed sensor 23 and the turbine speed sensor 19 to a sensor integrity check circuit 48, which sends appropriate signals to the logic circuitry of microcomputer 31 whenever either the transmission output speed sensor 23 or the turbine speed sensor 19 has an open or a short circuit therein. A frequency-to-voltage converter 49 also receives output from the transmission output speed sensor 23 and supplies a signal to an adjustable level comparator circuit 51, connected to the microcomputer 31, and to a speedometer buffer amplifier A1, which drives the speed indicator 28. An input protection and squaring circuit 52 receives the analog signal output of the turbine speed sensor 19 from the sensor integrity check circuitry 48 and converts these analog signals into digital signals having magnitudes appropriate for input to the microcomputer 31.

The range selector 8 sends signals indicating the selected range through the connector 38 and an input encoding circuit 53 which encodes the signal indicative of the selected range into a binary number suitable for input into the microcomputer 31.

Signals from terminals F1-F9 of the transmission gear position sensor 3 pass through the connector 44 to an input encoding and maximum range circuit 54, which converts the nine analog signals into four digital inputs into microcomputer 31, thus economizing on input lines into the microcomputer 31. Input encoding and maximum range select circuit 54 permits the limiting of the transmission 4 to a desired maximum forward speed.

The microcomputer 31 supplies control signals to a neutral safety solenoid 56, a retarder overspeed solenoid 57, a retarder interrupt solenoid 58, a down solenoid 59, a pre-position solenoid 61, an up solenoid 62, and a lock-up solenoid 22 through the connector 44 and buffer amplifiers A5-A11, respectively. The microcomputer 31 actuates the neutral safety solenoid 56 to shift the transmission to neutral in the event that a system failure occurs while the transmission 4 is in reverse. The down solenoid 59, the pre-position solenoid 61 and the up solenoid 62 comprise the clutch solenoid assembly 21; and the retarder solenoid assembly 16 includes the retarder overspeed solenoid 57 and the retarder interrupt solenoid 58. The buffer amplifiers A5-A11 have current gain sufficient to provide adequate current for driving the respective devices connected thereto.

A retarder pressure switch 63 and a limit switch 64 supply inputs to the microcomputer 31 through the connector 44 and input protection circuits 66 and 67, respectively.

The microcomputer 31 also supplies outputs to the display 5 through a connector 68 and buffer amplifiers A12-A20, which provide current gain sufficient to drive the display 5, which may include a sixteen segment display. Other outputs from the microcomputer 31 drive a retarder indicator 69, a lockup indicator 71 and a computer inoperative indicator 72 through buffer amplifiers A21-A23, respectively.

Figure 3A:
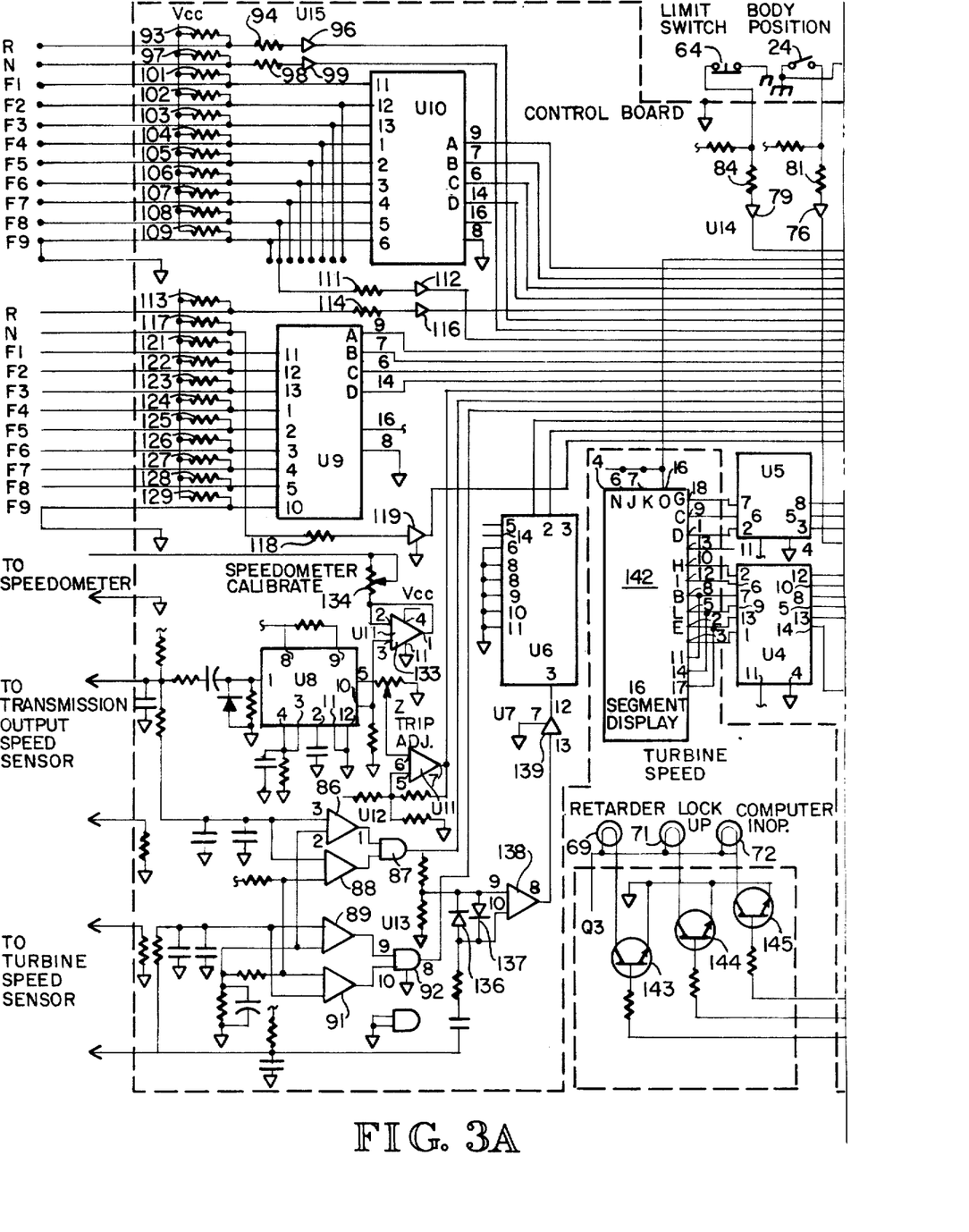
FIGS. 3(a) and 3(b) taken together are a schematic diagram of a transmission control system according to the invention.
Figure 3B:
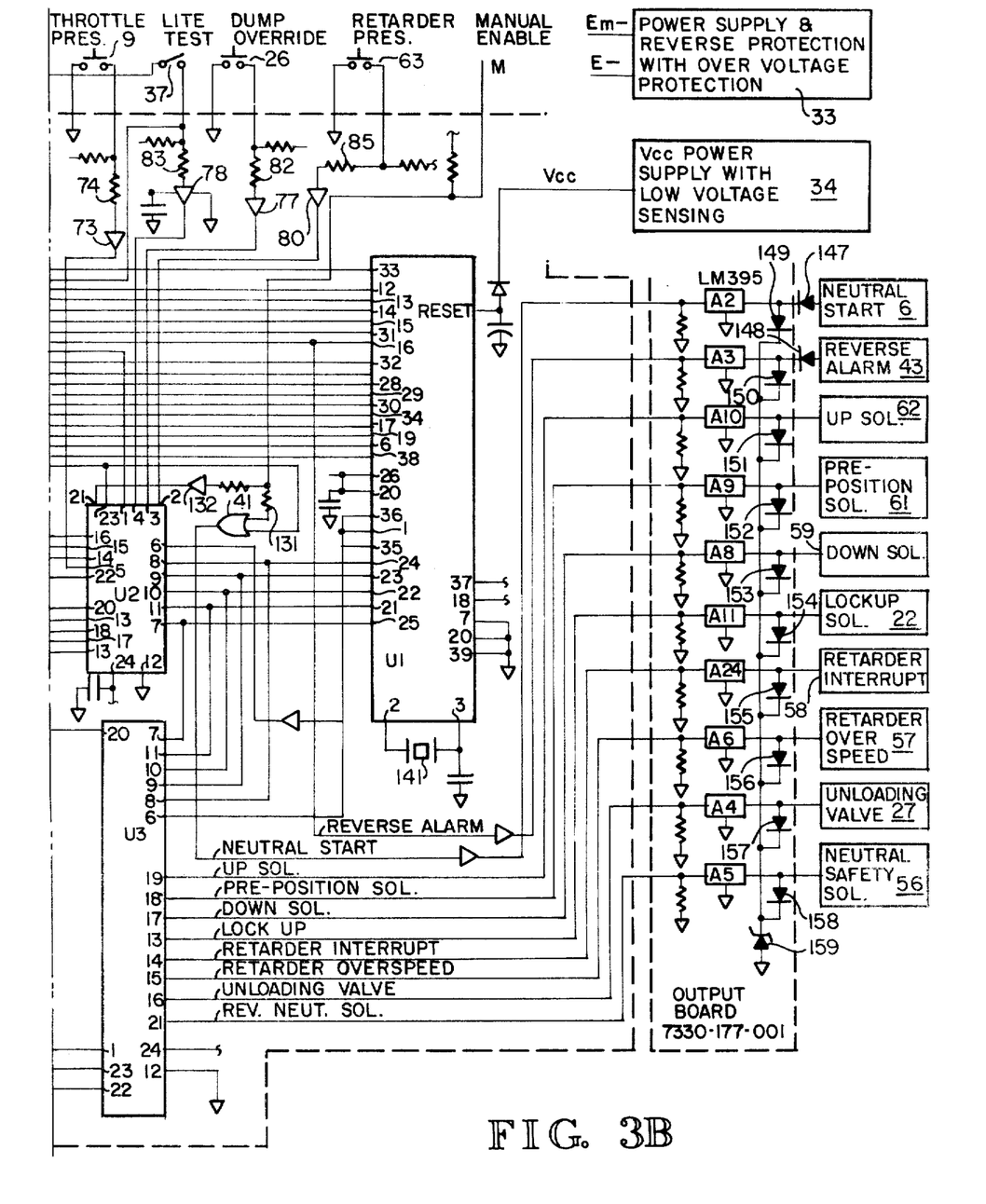

Referring to FIGS. 3(a) and 3(b), the input protection circuitry 36 includes a buffer 73 in series with a resistance 74 which connect the throttle position switch 9 to an expander U2. When the input voltage from the throttle position switch 9 to the buffer 73 is below a predetermined threshold, the output of the buffer 73 to a microprocessor U1 is a logic low; if the input to the buffer 73 rises above a second threshold, the output thereof switches to a logic high. Similarly, buffers 76-80 and corresponding series resistances 81-85 connect the body position switch 24, the override switch 26, the light test circuit 37, the limit switch 64 and the retarder pressure switch 63, respectively, to the expander U2. The expander U2 accepts a plurality of inputs and selectively multiplexes these inputs to a smaller number of outputs to economize on inputs into the microprocessor U1 and to facilitate interfacing the various electronic inputs and outputs therewith.

The sensor integrity circuit 48 includes a first comparator 86 having the output thereof connected to one input terminal of an AND gate 87 and a second comparator 88 having the output thereof connected to the second input of the AND gate 87 to test for short and open circuits in the transmission output speed sensor 23. A comparator 89 and a comparator 91 whose outputs feed into an AND gate 92 test for short and open circuits in the turbine speed sensor 19. In order for the system to operate, it is necessary that both the turbine speed sensor 19 and the transmission output speed sensor 23 function properly. Therefore, if either of the AND gates 87 or 92 receives an input indicating a short or open circuit, the microprocessor U1 will turn on the computer inoperative light 72, an appropriate error code will appear on the indicator 5; and the transmission 4 will remain in the same gear it was in when the failure occurred.

The input protection circuitry for the transmission gear position sensor 3 includes resistances 93 and 94 in series with a buffer 96 and resistances 97 and 98 in series with a buffer 99 for the R and N contacts, respectively, of the transmission gear position sensor 3. The buffer 96 supplies a signal to the reverse alarm 43 and to the microprocessor U1 whenever the transmission gear position sensor 3 indicates that the transmission 4 is in reverse gear; and the buffer 96 supplies a signal to the expander U2 when the transmission gear position sensor 3 indicates that the transmission 4 is in neutral. The input encoding circuitry 53 for the transmission gear position sensor 3 includes resistances 101-109, respectively, in series between the contacts F1-F9 of the transmission gear position sensor 3 and an expander and encoder U10, which converts the signals from F1-F9 into binary numbers for input into the microprocessor U1. A resistance 111 in series with a buffer 112 may be selectively connected to the contacts F1-F9 of the transmission gear position sensor 3 to supply a signal to the microprocessor U1 to limit the maximum range into which the transmission 4 may shift.

The input protection circuitry for the range selector 8 includes series resistances 113 and 114 between the R contact thereof and a buffer 116, which is connected to the microprocessor U1; and series resistances 117 and 118 connected between the N contact and a buffer 119 which supplies outputs to the neutral start OR gate 41. Series resistances 121-129 interface the F1-F9 contacts of the range selector 8 with an expander and encoder U9 which converts signals input thereto into binary numbers suitable for input into the microprocessor U1.

Both of the expanders and encoders U9 and U10 multiplex nine inputs to four outputs in order to reduce the number of connections that must be made to the microprocessor U1.

The adjustable level comparator circuit 51 includes an operational amplifier 133 and a variable resistance 134 connected between the operational amplifier 133 and the frequency to voltage converter 49.

The input protection and squaring circuitry 52 includes diodes 136 and 137 connected with opposed polarities across the inputs of an operational amplifier 138 whose output is connected to a Schmidt trigger 139, which decreases the rise and fall times of the square wave output of the input protection and squaring circuit 52. The output signal of the Schmidt trigger 139 is connected to a flipflop U6, which provides a signal to the microprocessor U1.

A crystal 141 provides a suitable time base for the microprocessor U1, which may be a programmable general purpose digital microcomputer of suitable speed and memory capacity for the present application, such as the INTEL 8748 microprocessor, which could be programmed to perform satisfactorily in the present invention by one of ordinary skill in the art. The microprocessor U1 supplies outputs to the components of the system controlled thereby through the expanders U2 and U3. The integrated circuits U4 and U5 provide the buffer amplifiers A12-A23 shown in FIG. 2, which interface the microprocessor U1 with a sixteen segment display 142, the retarder indicator 69, the lockup indicator 71, and the computer inoperative indicator 72. The driving circuitry for the retarder indicator 69 includes a transistor 143 with the base thereof connected to the expander U3 and the collector connected to the retarder indicator 69. The lockup indicator 71 and the computer inoperative indicator 72 include similar transistors 144 and 145, respectively, with the emitters of the three transistors 143-145 connected together and grounded.

The buffer amplifier A2 amplifies the output of the AND gate 130 and supplies an actuating voltage to the neutral start solenoid 6 through a diode 147; and the microprocessor U1 actuates the reverse alarm 43 by means of the amplifier A3 and a diode 148. The overload protection circuitry includes diodes 149-158 having the anodes thereof connected to the neutral start solenoid 6, the reverse alarm 43, the up solenoid 62, the preposition solenoid 61, the down solenoid 59, the lockup solenoid 22, the retarder interrupt solenoid 58, the retarder overspeed solenoid 57, the unloading valve 27, and the neutral safety solenoid 56, respectively, and having the anodes thereof connected to the cathode of a Zener diode 159 which has a grounded anode.

The microprocessor U1 receives the various inputs hereinabove described to control the transmission 4. To perform an upshift, the operator sets the range selector 8 to any forward range position, depending upon the choice of maximum speed, and actuates a throttle. Upon the closing of the throttle position switch 9, and the engine attaining the selected speed as indicated by the turbine speed sensor 19, the microprocessor U1 initiates an upshift and disengages the retarder 14 by means of retarder interrupt solenoid 58. The limit switch 64 monitors the position of an actuator (not shown); and if the actuator is disengaged, then the microprocessor U1 actuates the down solenoid 59, which prepares the transmission 4 for shifting. A short time after energizing the down solenoid 59, the microprocessor U1 energizes the preposition solenoid 61 to engage the actuator in the transmission shift valves (not shown) and energizes the up solenoid 62, which shifts the transmission 4 up one gear. During any shift sequence the microprocessor U1 monitors the retarder 14, the lockup clutch of the torque converter 11 and the actuator. If the retarder 14, and the lockup are not disengaged, then the microprocessor U1 energizes the computer inoperative indicator 72; and the sixteen segment display 142 displays a code indicative of the malfunction. The microprocessor U1 similarly energizes the computer inoperative indicator 72 and the sixteen segment display 142 if the limit switch 64 fails to indicate actuator disengagement prior to shifting or if the limit switch 64 fails to indicate actuator engagement at the proper time during the shift sequence. The sequence continues until either the range set on range selector 8 is reached, a preprogramed upper range is reached, or until the engine 7 is either loaded or throttled down to a speed below the upshift speed.

In the event that the engine is loaded, or throttled down below a preset speed, or the range selector 8 is reduced to a lower setting, or a combination of these events occurs, the transmission 4 will be downshifted. In the downshift sequence, the turbine speed sensor 19 monitors the turbine speed; and when the turbine speed decreases below the preset downshift point, the microprocessor U1 disengages the lockup clutch in torque converter 11 through the lockup solenoid 72 and disengages the retarder 14 through the retarder interrupt solenoid 58. As in upshifting, the limit switch 64 monitors the position of the transmission shift actuation; and if the actuator is disengaged, then the microprocessor U1 energizes the up solenoid 62 to prepare the transmission 4 for shifting. After a short time interval, the microprocessor U1 sequentially energizes the preposition solenoid 61 and the down solenoid 59 to shift the transmission 4 down one gear. During the downshift sequence, the microprocessor U1 monitors the body position switch 24 to inhibit shifting into reverse when the cargo body is up. The downshift sequence continues until the engine speed remains above the downshift speed or until the transmission 4 reaches first gear. The transmission 4 will not shift into neutral unless the output shaft speed thereof is below a preset speed and the range selector is in neutral.

Either the microprocessor U1 or the operator of the vehicle may control the retarder 14, but the microprocessor U1 will actuate the retarder 14 by means of the retarder overspeed solenoid 57 whenever the engine speed exceeds a preset limit. During shifting sequences, the microprocessor disables the retarder 14 to protect the transmission 4 from damage. The retarder pressure switch 63 indicates whether or not the retarder 14 is in operation; and if the retarder pressure switch 63 indicates retarder pressure, the microprocessor U1 inhibits the shifting even if the retarder interrupt solenoid 58 is energized.

Application of power to the system causes the transmission shift controller 2 to shift the transmission 4 into neutral if the vehicle is not moving if the range selector 8 is in neutral and if the throttle position switch 9 indicates that the throttle is not actuated. Under the above conditions, the transmission shift controller 2 shifts the transmission to neutral without checking the shift inhibit functions.

If the system suffers a full loss of electrical power, the transmission 4 stays in the gear range indicated on the display 5 at the time of the power interruption. In the event of a momentary, for example, 100 milliseconds or less, loss of electrical power, the transmission shift controller 2 loses no logic signals.

A failure of the throttle position switch 9 causes the microprocessor U1 to prevent the transmission 4 from upshifting; and the throttle position switch 9 is open when the engine 7 is idling so that the microprocessor U1 again prevents upshifting.

In case of failure of the body position switch 24, which normally signals the microproccessor U1 when the dump box is in an elevated position, the microprocessor U1 shifts the transmission 4 to neutral. The body position switch 24 has a delay, typically 600 milliseconds, in operation so that inadvertent short term operation does not cause the system to indicate a failure mode.

A failure of the retarder pressure switch 63 causes the microprocessor U1 to abort the selected shift; and the display 5 signals the malfunctioning of the retarder pressure switch 63 to the operator of the vehicle. The microprocessor U1 detects failure of the retarder interrupt solenoid 58 by means of the retarder pressure switch 63 and indicates such failure by turning on the computer inoperative indicator 72 and by displaying an error code on the display 5. Before every transmission shift, the retarder interrupt solenoid 63 should drop the fluid pressure in the retarder 14 to a predetermined value. The retarder indicator light 69 is on whenever the retarder 14 is engaged.

In case of failure of the turbine speed sensor 19, or the transmission output speed sensor 23, the microprocessor U1 turns on the computer inoperative light 72 and keeps the transmission 4 in whatever gear it was in when the failure occurred; and the display 5 continues to indicate the gear range along with an error code. If the engine 7 is turned off and then restarted during a failure of either the turbine speed sensor 19 or the transmission output speed sensor 23, the microprocessor U1 shifts the transmission 4 to neutral and permits the transmission 4 to operate only in first forward. During this failure mode, the transmission shift controller 2 is unable to effect shift inhibition, automatic retarder operation, or lockup clutch operation; however, the operator may still manually operate the retarder 14. The lack of a turbine speed signal indicates nonattainment of lockup in any gear range and prevents actuation of the retarder overspeed solenoid 57.

When an indication of "computer inoperative" occurs on sixteen segment display 142, the transmission shift controller 2 has operated to prevent all automatic operational functions, including shifting, and holds the vehicle in the range wherein the failure occurred. The operator of the vehicle must manually shift the transmission when the sixteen segment display 142 indicates "computer inoperative". Referring to FIG. 1, the system includes a manual control 161 which permits manual shifting when the operator finds manual shifting to be necessary. The neutral safety solenoid 56 shifts the transmission 4 to neutral in the event that a system failure other than computer inoperative occurs while the transmission 4 is in reverse.

Although the present invention has been described with reference to a particular embodiment thereof, it will be understood by those skilled in the art that numerous modifications may be made without departing from the scope of the invention. Accordingly, all modifications and equivalents which are properly within the scope of the appended claims are included in the present invention.

What is claimed is:

1. A control system for a multi-speed shiftable transmission, said transmission including a selectively operable speed range selector means for selecting a plurality of speed ranges, said plurality of speed ranges including a reverse speed range, a neutral range, and a plurality of forward speed ranges, a plurality of clutches selectively operable to provide different transmission output speed ranges, a transmission output shaft, and a torque convertor having a turbine and a lockup clutch therein, comprising:

first sensing means providing input signals indicative of a selected speed range for said transmission;

second sensing means providing input signals indicative of the actual speed range of said transmission;

third sensing means providing input signals indicative of the rotational speed of said turbine;

fourth sensing means providing input signals indicative of the rotational speed of said transmission output shaft;

means selectively actuating said plurality of clutches to shift transmission output speed ranges;

means for limiting the rotational speed of said transmission output shaft to a speed less than a predetermined speed;

means providing signals to selectively engage said lockup clutch to lock said torque convertor for direct drive; and control means responsive to said input signals for providing control signals to actuate said lockup clutch and said plurality of clutches according to preset conditions to effect shifting of said transmission to said selected speed range, said control means including digital computing means and encoding means for connecting said input signals to said digital computing means, and means for inhibiting shifting when said lockup clutch locks said torque convertor for direct drive and means for inhibiting shifting when said means for limiting the rotational speed of said transmission output shaft is engaged.

2. A control system according to claim 1 further comprising means for providing an input signal to said digital computing means indicative of a failure in the operation of any one of said sensing means.

3. A control system according to claim 1 further comprising means for preventing input signals which do not meet a predetermined criterion from being input into said digital computing means.

4. A control system for a multi-speed shiftable transmission, said transmission including a speed range selector means for selecting a plurality of speed ranges, said speed ranges including a reverse speed range, a neutral range and a plurality of forward speed ranges, a plurality of clutches having selectively operable actuation means therefor to provide different transmission output speed ranges, a transmission output shaft, and a torque convertor having a turbine therein, comprising:

first sensing means providing input signals indicative of a selected speed range for said transmission;

second sensing means providing input signals indicative of the actual speed range of said transmission;

third sensing means providing input signals indicative of the rotational speed of said turbine;

fourth sensing means providing input signals indicative of the rotational speed of said transmission output shaft; and control means responsive to said input signals for providing control signals to actuate said plurality of clutches according to preset conditions to effect shifting of said transmission to said selected speed range, said control means including digital computing means and encoding means for connecting said input signals to said digital computing means, said encoding means including an expander for multiplexing a plurality of signal inputs thereto into a plurality of signals for input into said digital computing means.

5. A control system for a multi-speed shiftable transmission, said transmission including a selectively operable speed range selector means for selecting a plurality of speed ranges, said plurality of speed ranges including a reverse speed range, a neutral range, and a plurality of forward speed ranges, a plurality of clutches selectively operable to provide different transmission output speed ranges, a transmission output shaft, and a torque convertor, said torque convertor having a turbine and a lockup clutch therein, comprising:

first sensing means providing input signals indicative of a selected speed range for said transmission;

second sensing means providing input signals indicative of the actual speed range of said transmission;

third sensing means providing input signals indicative of the rotational speed of said turbine;

fourth sensing means providing input signals indicative of the rotational speed of said transmission output shaft;

means selectively actuating said plurality of clutches to shift transmission output speed ranges;

means for limiting the rotational speed of said transmission output shaft to a speed less than a predetermined speed;

means providing signals to selectively engage said lockup clutch to lock said torque convertor for direct drive; and control means responsive to said input signals for providing control signals to actuate said lockup clutch and said plurality of clutches according to preset conditions to effect shifting of said transmission to said selected speed range, said control means including digital computing means and encoding means for connecting said input signals to said digital computing means, said encoding means including an expander for for multiplexing a plurality of signal inputs thereto into a plurality of signals for input into said digital computing means, means for inhibiting shifting when said lockup clutch locks said torque convertor for direct drive and means for inhibiting shifting when said means for limiting the rotational speed of said transmission output shaft is engaged.

6. A control system according to claim 4 or claim 5 further including means for selecting a maximum speed range into which said transmission may shift.

7. A control system for a multi-speed shiftable transmission, said transmission including a speed range selector means for selecting a plurality of speed ranges, said speed ranges including a reverse speed range, a neutral range and a plurality of forward speed ranges, a plurality of clutches having selectively operable actuation means therefor to provide different transmission output speed ranges, a transmission output shaft, and a torque convertor having a turbine therein, comprising:

first sensing means providing input signals indicative of a selected speed range for said transmission;

second sensing means providing input signals indicative of the actual speed range of said transmission;

third sensing means providing input signals indicative of the rotational speed of said turbine;

fourth sensing means providing input signals indicative of the rotational speed of said transmission output shaft;

control means including digital computing means and encoding means for connecting said input signals to said digital computing means, responsive to said input signals for providing control signals to actuate said plurality of clutches according to preset conditions to effect shifting of said transmission to said selected speed ranges; and means for providing an input signal to said digital computing means indicative of a failure in the operation of any one of such sensing means.

8. A control system for a multi-speed shiftable transmission, said transmission including a speed range selector means for selecting a plurality of speed ranges, said speed ranges including a reverse speed range, a neutral range and a plurality of forward speed ranges, a plurality of clutches having selectively operable actuation means therefor to provide different transmission output speed ranges, a transmission output shaft, and a torque convertor having a turbine therein, comprising:

first sensing means providing input signals indicative of a selected speed range for said transmission;

second sensing means providing input signals indicative of the actual speed range of said transmission;

third sensing means providing input signals indicative of the rotational speed of said turbine;

fourth sensing means providing input signals indicative of the rotational speed of said transmission output shaft;

control means including digital computing means and encoding means for connecting said input signals to said digital computing means, responsive to said input signals for providing control signals to actuate said plurality of clutches according to preset conditions to effect shifting of said transmission to said selected speed ranges; and means for preventing input signals which do not meet a predetermined criterion from being input into said digital computing means.

* * * * *